United States Patent [19]
Banikiotes et al.

[11] 3,839,847
[45] Oct. 8, 1974

[54] CRYOGENIC HYDROGEN ADSORPTION SYSTEM

[75] Inventors: Gregory C. Banikiotes, Seaford; Edward H. Van Baush, Pearl River, both of N.Y.

[73] Assignee: Hydrocarbon Research, Inc., New York, N.Y.

[22] Filed: July 5, 1972

[21] Appl. No.: 268,991

[52] U.S. Cl............................. 55/58, 62/18, 55/62
[51] Int. Cl............................................. B01d 51/06
[58] Field of Search.............. 62/13, 14, 15, 18, 22; 55/25, 74, 75, 68, 62, 208, 58

[56] References Cited
UNITED STATES PATENTS

| | | | |
|---|---|---|---|
| 3,140,931 | 7/1964 | McRobbie | 55/25 |
| 3,282,062 | 11/1966 | Hudson | 62/18 |
| 3,355,859 | 12/1967 | Karwat | 62/18 |
| 3,365,859 | 1/1968 | Sandberg | 55/25 |
| 3,691,779 | 9/1972 | Meisler | 62/23 |

Primary Examiner—Norman Yudkoff
Assistant Examiner—F. Sever

[57] ABSTRACT

High purity, 97 to 99.9 percent, hydrogen is obtained through a separation process comprising a low temperature refrigeration system operating below 120°R, and an adsorption system operating on the adiabatic pressure-swing principle within the temperature range of 260° to 140°R. The adsorption system contains particulate material in admixture with the adsorbent medium. The material provides sufficient heat capacity within the adsorption system to minimize any temperature fluctuations in the adsorption bed between the adsorption period and the desorption period.

3 Claims, 1 Drawing Figure

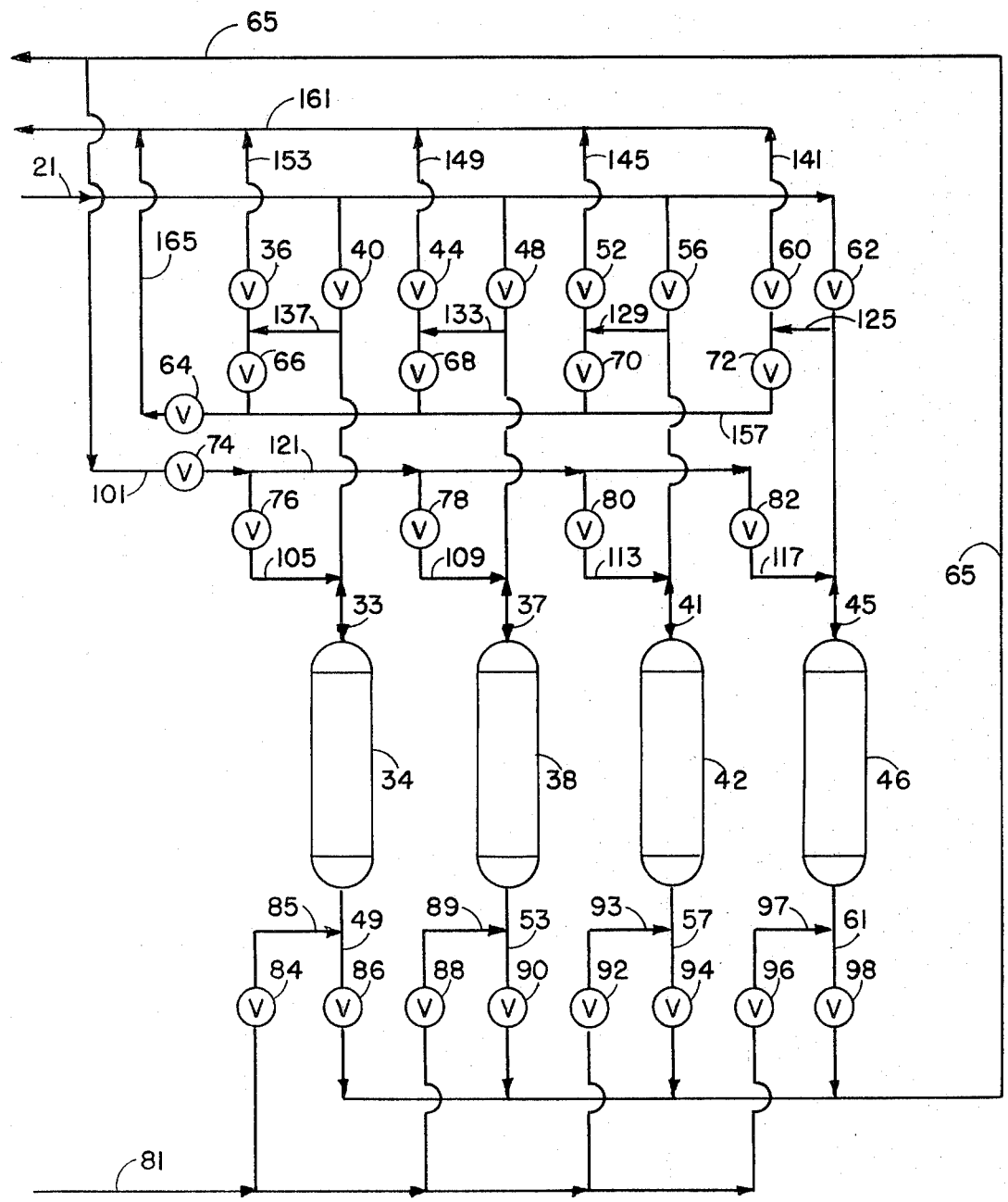

3,839,847

CRYOGENIC HYDROGEN ADSORPTION SYSTEM

BACKGROUND OF THE INVENTION

Various methods for upgrading a hydrogen-rich gas to produce a hydrogen product gas of high purity have been used in the art. Ambient and higher temperature processes have been used to separate high boiling impurities such as carbon dioxide, high boiling hydrocarbons, hydrogen sulfide, moisture, and the like from hydrogen and cryogenic systems and have been used to remove low boiling impurities such as methane, nitrogen and carbon monoxide from hydrogen.

Cryogenic processes such as disclosed in the U.S. Pat. Nos. 3,223,745 and 3,359,744 have shown methods for upgrading a hydrogen-rich gas to an impurity level of 3 to 10 percent from a feed originally containing 40 to 50 percent impurities (the percent figures used herein are mole percents). The impurities are mostly low boiling hydrocarbons, nitrogen and carbon monoxide and, are removed through stage cooling and condensation processes. The feed is cooled to a required temperature level of 120° to 100°R since such a method provides an optimum system design.

When product purity in excess of 97 percent is required, stage cooling and condensation techniques are generally not adequate, especially when considerable quantities of nitrogen and carbon monoxide are present in the feed gas. A process using liquid methane and propane is described in U.S. Pat. No. 3,073,093. This method makes it possible to obtain product purities with less than 1 ppm of contaminants. Hydrogen is purified to this extent when liquid hydrogen is the required product; but such purity is generally not necessary for most applications where the hydrogen is to be utilized as chemical reactants. Chemical reagent hydrogen has a purity in the range of 97 to 99.9 percent.

In making chemical reagent grade hydrogen, adiabatic pressure-swing adsorption has been used to reach the 97 to 99.9 percent pure hydrogen. However, the basic adiabatic pressure-swing adsorbers are subject to temperature fluctuations in the adsorber beds between the adsorption and desorption parts of the cycle. Therefore, it is necessary to design the system so as to minimize the temperature fluctuation in the adsorber beds between the adsorption and desorption parts of the cycle.

The present invention achieves an adiabatic pressure-swing process which approaches isothermal operation between adsorption and desorption as closely as practically and economically feasible.

SUMMARY OF THE INVENTION

The present invention is an improvement over U.S. Ser. No. 888,424 and now U.S. Pat. No. 3,691,779 preferably relates to an integrated cryogenic system for obtaining a hydrogen stream with a purity between about 97 and about 99.9 percent. Such a process separates hydrogen in a state of high purity from a mixture rich in nitrogen, methane and carbon monoxide, and containing trace amounts of low boiling hydrocarbons, and argon and oxygen, by the combined use of the succession of cooling stages with each one being at a lower temperature than the previous stage. The hydrogen-enriched vapor effluent resulting from the series of cooling and condensation stages is passed to an adsorption system for the purification. Preferably the system comprises four adsorbers.

The operation of the adsorbers is improved by adding particulate aluminum or other material such as iron or steel to the adsorption bed in admixture with the adsorbent medium such as silica gel, molecular sieves or activated charcoal. The presence of this material permits a closer approach to the isothermal operation of the bed. The nonadsorbent material which is admixed with the adsorbent should have the proper combination of heat capacity, heat conductivity and density to provide adequate useful heat capacity in the adsorbers.

DESCRIPTION OF THE DRAWING

The drawing is a schematic view of the portion of a cryogenic separation process suitable for adsorption purification of hydrogen.

DESCRIPTION OF THE PREFERRED EMBODIMENT

In accordance with this invention, a preferred embodiment will be described for the purification of a pressurized hydrogen-containing feed stream. In a cryogenic system for such purification, it is preferred to operate so as to prevent the formation of any solids within the system.

In an adsorption system as herein described, the refrigeration requirement is minimized by maintaining the temperature of the system during desorption as close as possible to the temperature of the system during adsorption. In order to achieve this, it is most important to minimize temperature fluctuations in the adsorber beds.

The first portion of this process comprises the cryogenic purification of a gaseous feed stream containing between about 30 and about 70 percent hydrogen to a hydrogen concentration of about 97 mol percent. Such a system is set forth in pending U.S. Ser. No. 888,424 now U.S. Pat. No. 3,691,779. It is then ready to be passed to the adsorption system which is used to upgrade the partially purified stream to produce the high purity hydrogen stream containing about 97 to 99.9 percent hydrogen by volume. The residual amount of unadsorbed contaminants consisting of nitrogen and trace amounts of carbon monoxide and methane.

The adsorption system has a limited capacity to adsorb contaminants. When this capacity has been reached the contaminants must be desorbed in order to prepare the medium for further adsorption. The desorption and adsorption steps are mutually exclusive. A single adsorption vessel could be used in the present process if a non-continuous operation were not objectionable. However, it is preferred to provide a plurality of adsorption vessels.

In addition to providing for a continuous process, it has been discovered in the practice of this invention that by using four adsorption beds in a programmed adsorption cycle, it is also possible to control and significantly reduce any pressure fluctuations throughout the purification system. Such control of pressure fluctuations means that while one adsorption bed is adsorbing, the remaining three beds are simultaneously undergoing the other stages of the adsorption cycle, consisting of depressurization, desorption and pressurization respectively, as hereinafter described. Each of the operations in the cycle takes place in about a 30 minute time period. In this preferred description of the process, four adsorption vessels are disclosed to clearly illustrate and set forth the adiabatic pressure-swing purification process of this invention. It is to be understood that more than four such adsorption vessels can be used in practicing the present invention with a properly programmed adsorption cycle.

In the adiabatic pressure-swing operation, the adsorption cycle is operated so that the desorption of each bed is effected partially by reducing the pressure in the vessel, and partially using a low-pressure contaminant-free hydrogen stream to desorb residual contaminants from the beds.

The four stages of the adsorption cycle will be separately described. Each stage described, i.e., adsorption, depressurization, desorption and pressurization will refer to the four adsorption zones 34, 38, 42 and 46; but it is to be understood that in actual operation, each adsorption zone is operating on a different stage of the adsorption cycle. However, when an adsorption cycle is almost complete, the related adsorption zone stages (adsorption and pressurization, desorption and depressurization) are operated with an overlap so as to insure a smooth transition within the system thereby helping to avoid any pressure surges.

The flow from the system on pressurization must balance the flow to the system on depressurization in order to maintain the temperature profile. The more rapidly the pressurization-depressurization stages are operated, the greater the unbalancing of the above mentioned flows. Therefore, the pressurization-depressurization stages must be operated over an extended period of time to provide a steady product flow thereby maintaining the exchanger capacity and the compression equipment at operating levels. This is best done by fixing the adsorbing period at preferably 30 minutes. At this rate the adsorption system becomes completely steady but for the last fraction of the period when the adsorption stage volume can act as a surge drum to dampen any pressure fluctuation effects.

In a bed adsorbing the contaminants from the contacting hydrogen stream, the gaseous effluent in stream 21 passes through valve 40, 48, 56 or 62, then through line 33, 37, 41 or 45 respectively to undergo adsorption in adsorption stage 34, 38, 42 or 46 respectively. The contaminants are adsorbed on the adsorbent bed for about 30 minutes. Adsorbents that are suitable for use in the adsorption zone are silica gel, activated carbon and molecular sieves. The adsorption takes place between about 260°R and about 140°R and at a pressure between about 300 and about 900 psia.

The purified hydrogen stream leaves the adsorption zone 34, 38, 42 or 46 through line 49, 53, 57 or 61 and valve 86, 90, 94 or 98 respectively. The purified hydrogen stream passes out of the system in line 65. The residual impurities consist of nitrogen, carbon monoxide, and methane. The purified hydrogen in line 65 can be further improved to reduce the carbon monoxide level to about one part per million.

The depressurization stage of the adsorption period reduces the pressure in adsorption zone 34, 38, 42 or 46 from operating pressure to about 35 psia. Depressurization takes place through line 33, 37, 41 or 45, line 137, 133, 129 or 125, valve 66, 68, 70 or 72 and line 157, valve 64 and line 165 at which point it joins line 161 for passage out of the system.

A low pressure stream is used for the desorption of the adsorption zones 34, 38, 42 and 46 when the adsorption bed has been sufficiently contaminated. A purified hydrogen stream is preferred. At that time, the valves allowing the gaseous effluent in line 21 to pass through the bed, as previously described, will be closed. The low pressure stream in line 81 will pass to either adsorption zone 34, 38, 42 or 46 through valve 84, 88, 92 or 96 and line 85, 89, 93 or 97 respectively. This manner of adsorption-desorption is termed adiabatic "pressure swing." The term "pressure swing" is meant to encompass the pressure variation between the desorbing stream and the stream from which contaminants are adsorbed. The adsorption zone which was slightly heated during the adsorption stage is cooled to operating temperature during the desorption stage.

When the contaminants have been desorbed from adsorption bed 34, 38, 42 or 46, the contaminated hydrogen stream passes through line 33, 37, 41 or 45; and line 137, 133, 129 or 125; and valve 36, 44, 52 or 60; and line 153, 149, 145 or 141 respectively to line 161.

In the adsorption cycle, the pressurization stage uses hydrogen to bring the pressure in adsorption zone 34, 38, 42 or 46 to operating pressure so that the regenerated adsorption bed is now ready for the adsorption stage, thereby completing the programmed adsorption cycle. The pressurization stage takes purified hydrogen from line 65 through line 101, valve 74 and line 121 which then pressurizes sealed adsorption zone 34, 38, 42 or 46 by passing through valve 76, 78, 80 or 82; line 105, 109, 113 or 117; and line 33, 37, 41 and 45. The pressurized adsorption zone is now suitable for beginning the adsorption cycle again.

During the adsorption, depressurization, desorption and pressurization periods of adsorbers 34, 38, 42 and 46 there can be a variation in the average temperature of the adsorbent bed of between 5° and 20°F depending on the temperature of the adsorber feed, the temperature of the desorption gas feed, the ratio of desorption gas to feed gas the pressure ratio between adsorption and desorption and also the level of impurities to be removed. This temperature fluctuation has a significant effect on the operation and the product purity. Specifically, at a given pressure ratio between adsorption and desorption, and at a given feed gas rate and impurity concentration, the smaller the temperature fluctuation in the bed between adsorption and desorption, the lower is the desorption gas rate required to accomplish the same degree of purification.

During repressuring of the vessel before adsorption there is an average increase of temperature throughout the bed and this detracts from the adsorbing qualities of the adsorbing medium. This increase is caused by the introduction of a high pressure stream into a low pressure vessel which creates a heat of compression. Other temperature effects are caused by the capacity of the adsorbing medium to readsorb as the vessel pressure increases. The act of depressuring a vessel prior to the desorption period results in the reverse of the above effects and cools the bed down which is detrimental to the desorbing act. Further, during the period of adsorption, when contaminants are adsorbed, there is a temperature warming effect on the bed and during the desorbing period, as the contaminants leave the bed there is a reverse effect and the bed cools. Both these temperature effects act against the desired act of adsorbing and desorbing. It has now been demonstrated that by adding a particulate material to the adsorbent medium there is a significant reduction in the temperature fluctation of the bed during and between adsorption and desorption, by the ability of the material to adsorb heat and release heat to dampen the temperature fluctuations in the bed. The particulate material combines the desirable qualitites of high heat capacity and high thermal conductivity such as aluminum, steel, iron, lead, quartz and the like, and is of such a size and shape that it will adsorb the heat and release the heat within the operating time period. A preferred size for the material would be within the size range of the adsorbing medium so that the two materials could be most intimately mixed to provide the best contact for the heat transfer. However, the size of the particulate material can vary between 40 U.S. Standard mesh and ¼ inch.

Having thus described the invention in general terms, reference is now made to a specific example which has been carried out in accordance with the techniques of the present invention and which should not be construed as unduly limiting thereof.

EXAMPLE I

The following example demonstrates the applicability and efficiency of the present invention for purifying hydrogen which contains various amounts of light hydrocarbons, carbon monoxide, nitrogen and argon. A feed gas of the following composition is subjected to a preliminary cryogenic stepwise purification starting at an initial pressure of 375 psia and a temperature of 100°F.

Composition:
| | | |
|---|---|---|
| $H_2$ | 57 | Mole Percent |
| Argon | 0.1 | do. |
| Nitrogen | 17.0 | do. |
| CO | 3.0 | do. |
| $CH_4$ | 22.0 | do. |
| $C_2H_6$ | .2 | do. |
| $C_2H_4$ | 0.7 | do. |
| | 100.0 | |

The partially purified hydrogen having the following composition leaves the last cooling stage in the cryogenic separation system at about 120°R and a pressure of about 365 psia.

Composition:
| | | |
|---|---|---|
| $H_2$ | 98 | Mole Percent |
| Argon | Trace | do. |
| Nitrogen | 1.65 | do. |
| CO | 0.35 | do. |
| $CH_4$ | Trace | do. |
| $C_2H_6$ | — | do. |
| $C_2H_4$ | — | do. |

The partially purified hydrogen is then fed to a four-bed adsorption system wherein each adsorber bed is filled with a silica gel adsorbent of 6 to 10 mesh U.S. Std. size and equal amounts of aluminum of 6 to 10 mesh U.S. Std.

The sequence of operation for each of the four beds is the following:

1. Bed (1) adsorbs contaminants for about 30 minutes at operating pressure and at an average temperature of 180°R.

2. Simultaneous with adsorption in bed (1), the following sequence of operations occur during the thirty-minute period:
   a. Bed (4) is depressured to about 2 atmospheres.
   b. Bed (3) is desorbed of contaminants at about 2 atmospheres by a low pressure purified hydrogen stream. Bed (3) which was slightly heated during the "adiabatic" adsorption period is cooled to operating temperature during the "adiabatic" desorption period.
   c. Regenerated bed (2) is pressurized to operating pressure with purified hydrogen and becomes operable as a fresh adsorber bed when the time sequence for adsorber bed (1) is completed.

The adsorber beds undergo a temperature fluctuation of between 5° and 10°F. The resulting hydrogen product has a purity of at least 99.3 percent hydrogen.

The following Table I compares the operation of the adsorber bed containing 100 percent silica gel with an adsorber bed containing 50 percent silica gel and 50 percent aluminum. The absorption temperature is 180°R and the desorption temperature is 180°R. The adsorption pressure is 365 psia and the desorption pressure is 25 psia. As will be noted, the temperature fluctuation, in the bed of 100 percent silica gel, is twice that of the bed containing equal parts of silica gel and alumina. It is also to be noted that the 100 percent silica gel bed yields a hydrogen product having an impurity content of about two-thirds more than the impurity content of the adsorber bed containing equal parts silica gel and aluminum.

TABLE I

COMPARISON OF ADSORBER WITHOUT ALUMINUM VERSUS ADSORBER WITH ALUMINUM

| Adsorbent | % Impurity in Feed | Temperature Fluctuation in Bed | Average % Impurity in $H_2$ Product |
|---|---|---|---|
| 100% Silica Gel | 2.0 | 15°F. | 1.10 |
| 50% by Volume Silica Gel 50% by Volume Aluminum | 2.0 | 7.5°F | 0.684 |

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. An improved process for the cryogenic adsorption purification of hydrogen to obtain a product of 97 to 99.9 percent hydrogen wherein purified hydrogen is fed to an adsorption system which is operated at a temperature between about 140°R and 260°R, at a pressure between 20 and 900 psia and such that the adsorption, depressurization, desorption and pressurization steps are carried out to minimize pressure fluctuations throughout the process wherein the improvement comprises the addition of particulate material having a high heat capacity and a high thermal conductivity selected from the group consisting of aluminum, steel, iron and quartz, to the adsorption medium forming an admixture thereof to thereby minimize temperature fluctuations during the operation of the adsorption system.

2. The process of claim 1 wherein the adsorption medium is silica gel and the particulate material is aluminum in a ratio of 1:1.

3. The process of claim 2 wherein the temperature fluctuation within the adsorption system is maintained between 5° and 10°F.

* * * * *